United States Patent
Kanai et al.

(10) Patent No.: US 8,777,302 B2
(45) Date of Patent: Jul. 15, 2014

(54) SUNSHADE APPARATUS

(71) Applicant: Yachito Industry Co., Ltd., Sayama (JP)

(72) Inventors: Toshiyuki Kanai, Sakura (JP); Tatsuaki Uehara, Sakura (JP)

(73) Assignee: Yachiyo Industry Co., Ltd., Sayama-Shi (JP)

( * ) Notice: Subject to any disclaimer, the term of this patent is extended or adjusted under 35 U.S.C. 154(b) by 0 days.

(21) Appl. No.: 13/832,968

(22) Filed: Mar. 15, 2013

(65) Prior Publication Data

US 2013/0249253 A1 Sep. 26, 2013

(30) Foreign Application Priority Data

Mar. 21, 2012 (JP) ................................. 2012-063939

(51) Int. Cl.
*B60J 3/02* (2006.01)
*B60J 7/00* (2006.01)

(52) U.S. Cl.
CPC . *B60J 3/02* (2013.01); *B60J 7/0015* (2013.01)
USPC ........................ 296/214; 160/370.22; 160/262

(58) Field of Classification Search
CPC ........... B60J 3/02; B60J 7/0007; B60J 7/0015
USPC .......... 296/214; 160/242, 243, 245–247, 260, 160/262, 370.22
See application file for complete search history.

(56) References Cited

U.S. PATENT DOCUMENTS

| | | | | |
|---|---|---|---|---|
| 3,075,805 | A * | 1/1963 | Golde et al. | 296/98 |
| 6,186,587 | B1 * | 2/2001 | Entenmann | 296/214 |
| 6,523,770 | B2 * | 2/2003 | Peeters | 242/376 |
| 7,008,009 | B2 * | 3/2006 | Grimm et al. | 296/214 |
| 8,602,082 | B2 * | 12/2013 | Walter | 160/370.22 |

FOREIGN PATENT DOCUMENTS

| | | | | |
|---|---|---|---|---|
| DE | 102006046105 A1 * | 4/2008 | | B60J 7/00 |
| DE | 102010018735 A1 * | 11/2011 | | |
| JP | 2006-290201 | 10/2006 | | |

* cited by examiner

*Primary Examiner* — Dennis H Pedder
(74) *Attorney, Agent, or Firm* — Rankin, Hill & Clark LLP

(57) ABSTRACT

There is provided a sunshade apparatus comprising a pair of guide rails, a screen to move along each guide rail, and a roll-up device to send off or roll up the screen. The roll-up device comprises a roll-up shaft having bending flexibility, a pair of end members disposed at both ends of the roll-up shaft, a pair of support members to support each end member, and an abutment member including a push-up portion to bend the roll-up shaft so as to protrude upward and a positioning portion to be disposed on the side of the opening relatively to the roll-up shaft to position the roll-up shaft. Each end member is formed so as to be movable relatively to each support member in an open-close direction when the opening is opened or closed by use of the screen.

8 Claims, 8 Drawing Sheets

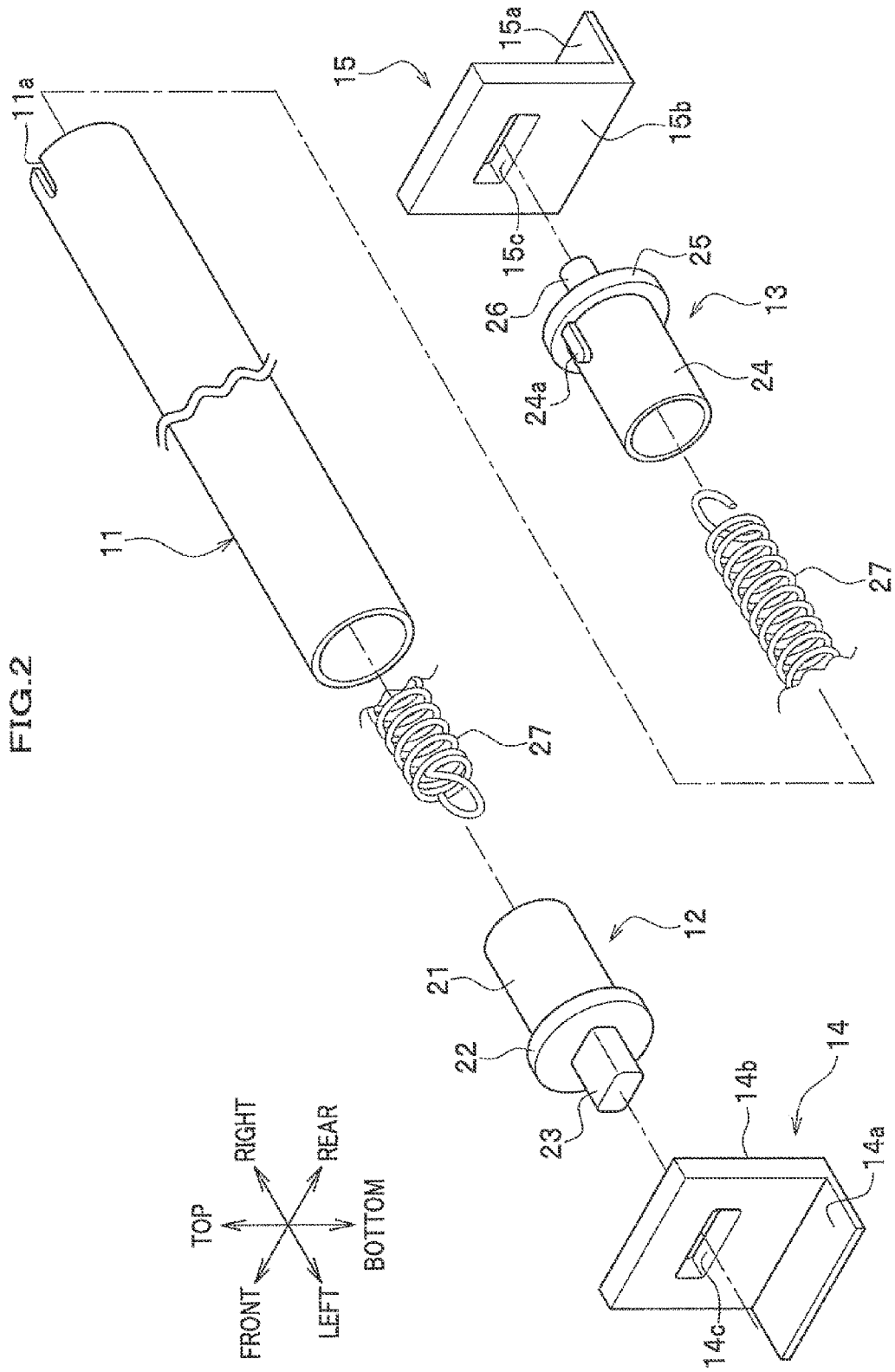

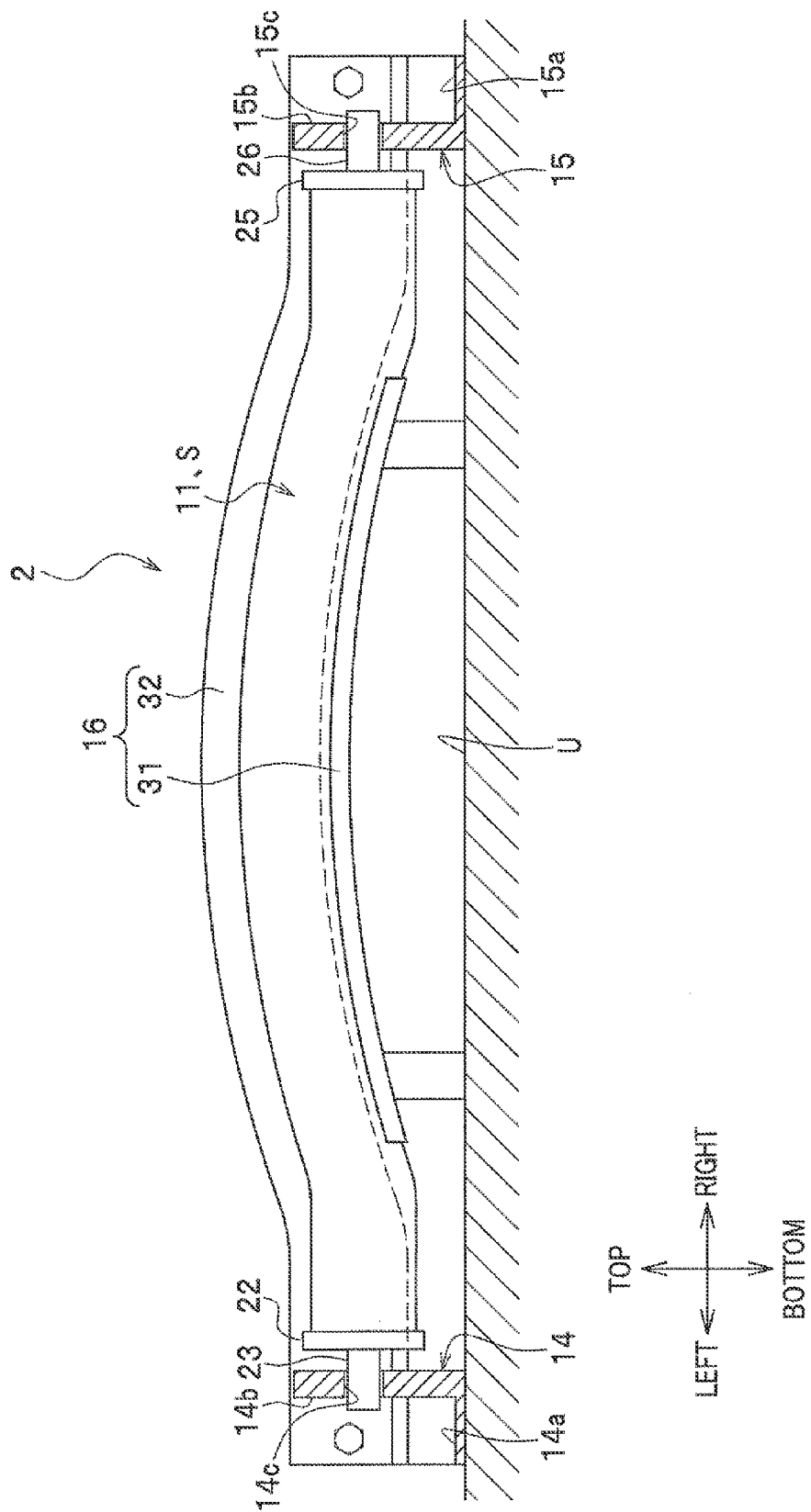

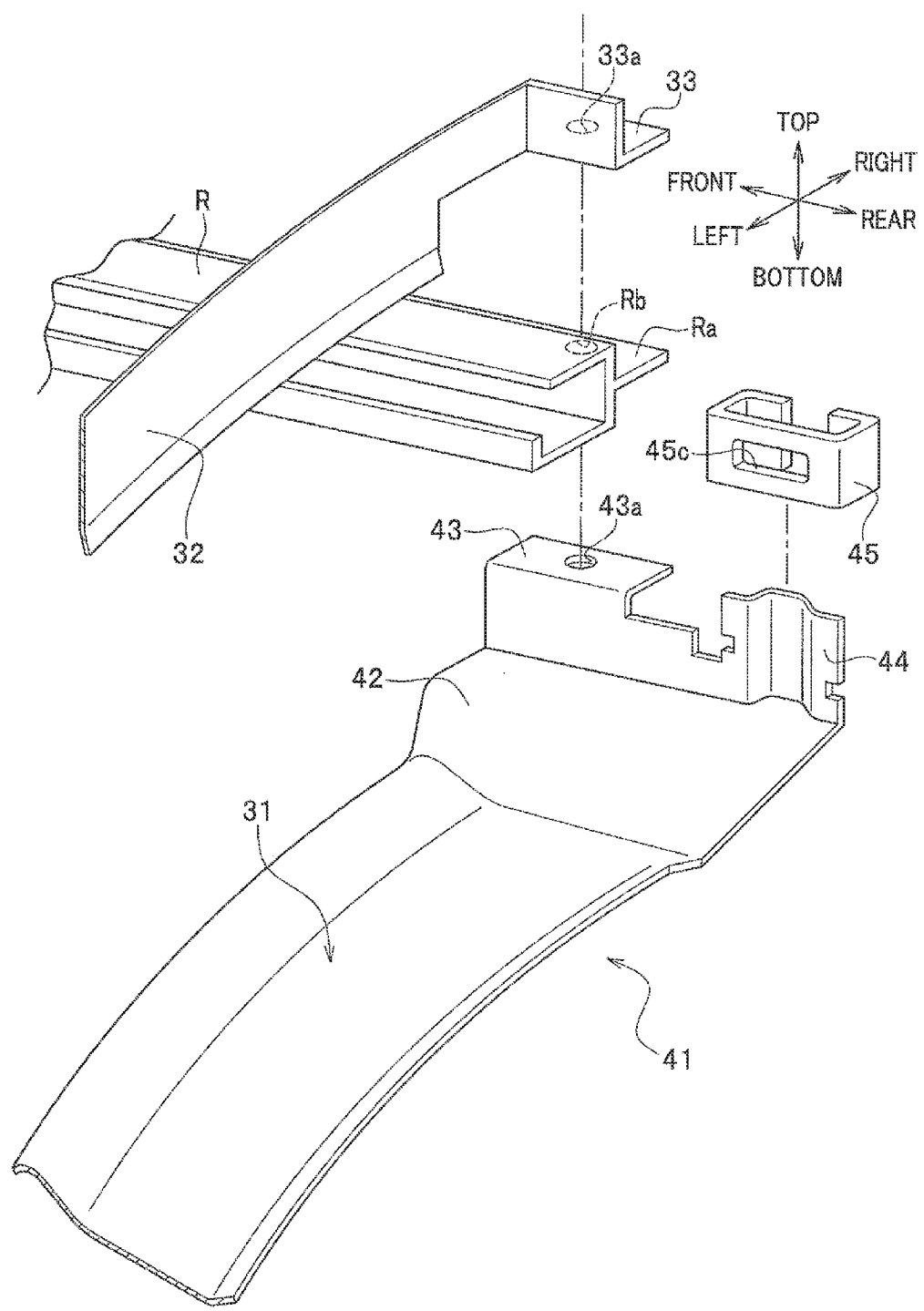

SUNSHADE APPARATUS

CROSS REFERENCE TO RELATED APPLICATIONS

This application claims the foreign priority benefit under Title 35, United States Code, 119 (a)-(d) of Japanese Patent Application No. 2012-063939, filed on Mar. 21, 2012 in the Japan Patent Office, the disclosure of which is herein incorporated by reference in its entirety.

BACKGROUND OF THE INVENTION

1. Technical Field

The present invention relates to a sunshade apparatus to be mounted on a roof of a vehicle.

2. Description of Background Art

As a sunshade apparatus to be mounted over an opening of a roof of a vehicle, for example, the structure described in the patent document 1 (JP, 2006-290201, A) is known. The sunshade apparatus described in the patent document 1 comprises a pair of guide rails disposed on both sides of the opening of the roof, a screen each of whose edges in the width direction of the screen is inserted into a corresponding guide rail of the pair of guide rails and can move along a longitudinal direction of each of the pair of guide rails to open or close the opening, and a roll-up shaft to send off or roll up the screen.

A plurality of shade-support members prolonged along in a width direction of the screen are disposed on the screen with predetermined intervals. As the shade-support members have curved shapes protruding upward, the screen is also curved so as to protrude upward.

Patent document 1: Japanese Patent Laid-Open Publication No. 2006-290201

BRIEF SUMMARY OF THE INVENTION

However, while a front area of the screen is curved so as to protrude upward, the roll-up shaft is a straight member. Therefore, an area of the screen near the roll-up shaft tends to sag or have wrinkles. It can be conceived that the roll-up shaft is made of a member having bending flexibility to be bent so as to protrude upward in order to solve the problem. But it can be thought that only a middle portion of the roll-up shaft is shifted by an input force during an operation to open or close the opening because both ends of the roll-up shaft are fixed to the roof by means of fixing members. Thus, if only a middle portion of the roll-up shaft is shifted, it causes the sag and/or the wrinkles of the screen and an operation load during an operation to open or close the opening becomes large.

The present invention is for solving such a problem. And it is an object of the present invention to provide a sunshade apparatus to prevent the sag and/or wrinkles of the screen and to reduce an operation load during an operation to open or close the opening by use of the screen.

The present invention provides a sunshade apparatus to be mounted over an opening of a roof of a vehicle, comprising:

a pair of guide rails to be disposed on both sides of the opening;

a screen to move along a longitudinal direction of each of the pair of guide rails to open or close the opening; and a roll-up device to send off or roll up the screen, wherein the roll-up device comprises a roll-up shaft having bending flexibility;

a pair of end members disposed at both ends of the roll-up shaft;

a pair of support members to be fixed to the vehicle to support each of the pair of end members; and an abutment member including a push-up portion to bend the roll-up shaft so as to protrude upward and a positioning portion to be disposed on the side of the opening relatively to the roll-up shaft to position the roll-up shaft, the pair of end members being formed so as to be movable relatively to the pair of support members in an open-close direction in which the screen is rolled up or sent off when the opening is opened or closed by use of the screen.

Furthermore, it is preferable that each of the pair of support members has a long hole long in the open-close direction and formed therein, and each of the pair of end members can move in the corresponding long hole.

By the structure mentioned above, tension acts on the screen in a width direction thereof so that the screen can be prevented from generating the sag and/or wrinkles because the roll-up shaft is bent upward by the push-up portion. Furthermore, each end member disposed at the both ends of the roll-up shaft can move in the open-close direction when the opening is opened or closed by use of the screen, so the entire roll-up shaft can be moved. Hereby, the roll-up shaft is prevented from shifting of only the middle portion so that the screen can be more steadily prevented from generating the sag and/or wrinkles and an operation load during an operation to open or close the opening by use of the screen can be reduced.

Furthermore, it is preferable that each of the pair of guide rails has a slit through which the screen moves, and each slit faces to the other slit, facing diagonally upward in the state that each guide rail is disposed on the vehicle. By this structure, the screen can move smoothly.

And furthermore, it is preferable that a grip portion provided at a front end of the screen has a curved shape protruding upward. By this structure, the screen can be more steadily prevented from generating the sag and/or wrinkles because tension acts on the entire screen.

By the sunshade apparatus according to the present invention, the screen can be prevented from generating the sag and/or wrinkles and an operation load during an operation to open or close the opening by use of the screen can be reduced.

BRIEF DESCRIPTION OF THE SEVERAL VIEWS OF THE DRAWING

FIG. 2 is an exploded perspective view showing a roll-up device in the first embodiment;

FIG. 3 is a rear view with partial cross sections in a view along a direction I of FIG. 1;

FIG. 7 is an exploded perspective partial view showing a roll-up device in a second embodiment;

DETAILED DESCRIPTION OF THE INVENTION

First Embodiment

Figure 1:
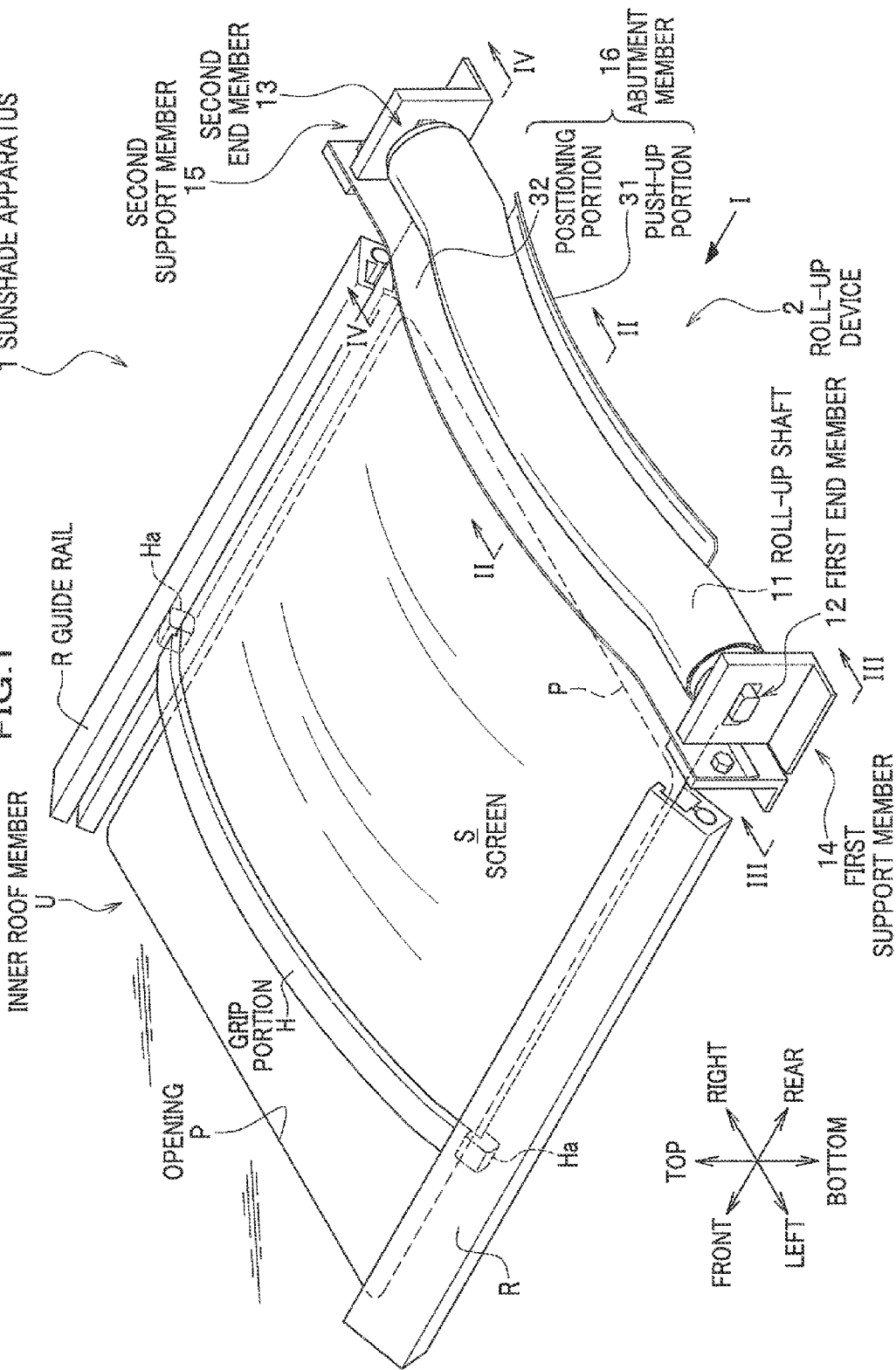
FIG. 1 is a perspective view of an entire sunshade apparatus in a first embodiment.

A first embodiment according to the present invention will be described in detail with reference to the attached drawings. An appropriate inner roof member is provided on the inside of a roof panel and fixedly attached to the roof panel (not shown) and so on which roof panel is an outer plate of the vehicle. The inner roof member is shown by symbol U in FIG. 1. An opening P shown in FIG. 1 is provided on the inner roof member U. And another opening (not shown) a size of which is roughly equal to the opening P is formed on the roof panel over the opening P. Both openings are communicated with each other when a screen S to be described later and a sun roof panel (not shown) are moved to open each opening, respectively. A term of a roof of a vehicle in the present invention has a wide concept including the roof panel and the inner roof member U.

As shown in FIG. 1, a sunshade apparatus 1 in this embodiment comprises a pair of guide rails R disposed on both sides of the opening P of an inner roof member U of a vehicle, for example, a car, a screen S each of whose edges in the width direction of the screen is inserted into a corresponding guide rail of the pair of guide rails and can move along a longitudinal direction of each of the pair of guide rails R and within each guide rail R to open or close the opening P, and a roll-up device 2 to send off or roll up the screen S. The sunshade apparatus 1 is for opening or shutting off the room space of the vehicle and taking in or shutting off the sunshine. Each direction toward a front, rear, left, right, top or bottom in the following description obeys each arrow in FIG. 1.

Each guide rail R is a metal extruded member and disposed on both sides of the opening P, namely, on the left and right sides of the opening P. Each guide rail R is a member for the screen S to slide in or on it. And another guide rail (not shown) is integrated with this each guide rail R so that the aforesaid sun roof panel slides on these another guide rails. Each guide rail R has a slit along a longitudinal side thereof. The slit of each guide rail R opens diagonally upward facing each other in this embodiment in the state that each guide rail R is disposed on the vehicle in order to give tension to the screen S by curving the screen S so as to protrude upward.

The screen S is a sheet member made of synthetic fiber and so on, and opens or closes the opening P by user's operation for opening or closing. A grip portion H with which user's hand is engaged is formed at a front end of the screen S. The grip portion H is a plastic plate member, and is prolonged along in a width direction (left-right direction) of the screen S. A slider Ha to slide in each guide rail R is equipped at each of left and right ends of the grip portion H. The grip portion H in this embodiment has a curved shape protruding upward which has approximately the same curvature as a roll-up shaft 11 being bent so as to protrude upward.

A roll-up device 2 to be disposed behind the opening P is a device for sending off or rolling up the screen S. And the roll-up device 2 is made so that the screen S can stop at a desired position, namely, at an arbitrary position when the screen S is being sent off.

The roll-up device 2 includes the roll-up shaft 11, a first end member 12, a second end member 13, a first support member 14, a second support member 15 and an abutment member 16 as shown in FIGS. 1 and 2.

The roll-up shaft 11 is a cylindrical member with bending flexibility. And one end of the screen S is fixed onto an outer surface of the roll-up shaft 11 so that a width direction of the screen S is parallel with a longitudinal direction of the roll-up shaft 11. A key aperture (or key groove) 11a which is to be engaged with a key 24a that will be mentioned later is formed at a right end of the roll-up shaft 11.

The first end member 12 is a member to be inserted into a left end portion of the roll-up shaft 11. The first end member 12 has an insert portion 21, a flange portion 22 and a protruding portion 23. The insert portion 21 is cylindrical. An outer diameter of the insert portion 21 is approximately equal to an inner diameter of the roll-up shaft 11 so that the first end member 12 can rotate relatively to the roll-up shaft 11.

An outer diameter of the flange portion 22 is equal to or larger than an outer diameter of the roll-up shaft 11. The protruding portion 23 protrudes leftward from a left surface of the flange portion 22 and is a rectangle-like column, namely, a cross sectional shape thereof is approximately rectangular. The protruding portion 23 is inserted into a long hole 14c of a first support member 14 to be described later and can move in an open-close direction (a front-rear direction) when the opening U is opened or closed by use of the screen S. That is, the long hole 14c is long in the open-close direction.

The second end member 13 is a member to be inserted into a right end portion of the roll-up shaft 11. The second end member 13 has an insert portion 24, a flange portion 25 and a shaft portion 26. The insert portion 24 is cylindrical. An outer diameter of the insert portion 24 is approximately equal to an inner diameter of the roll-up shaft 11. The aforementioned key 24a protruding outward is formed on an outer surface of the insert portion 24. The key 24a is engaged with the key aperture 11a of the roll-up shaft 11 as mentioned above. Hereby, the second end member 13 rotates integrally with the roll-up shaft 11.

An outer diameter of the flange portion 25 is equal to or larger than an outer diameter of the roll-up shaft 11. The shaft portion 26 protrudes rightward from a right surface of the flange portion 25 and is cylindrical. The shaft portion 26 is inserted into a long hole 15c of the second support member 15 to be described later in detail and can rotate in the long hole 15c. Furthermore, the shaft portion 26 can move in the front-rear direction when the opening U is opened or closed by use of the screen S. That is, the long hole 15c is long in the front-rear direction.

A torsion spring 27 like coil form is disposed between the first end member 12 and the second end member 13 in the roll-up shaft 11. One end of the torsion spring 27 is hooked or fixed to the insert portion 21 of the first end member 12, and the other end is hooked or fixed to the insert portion 24 of the second end member 13.

The sectional shape of the first support member 14 taken along a longitudinal direction of the roll-up shaft 11 is L shape. The first support member 14 has a fixing portion 14a to be fixed to the vehicle, a stand portion 14b standing from the fixing portion 14a and the long hole 14c formed in the stand portion 14b. The first support member 14 supports the first end member 12 so that the first end member 12 cannot rotate and can move in the front-rear direction within the long hole 14c. The long hole 14c is formed through the stand portion 14b in a left-right direction and prolonged in the front-rear direction. The stand portion 14b and the first end member 12 are equipped at approximately right angles to each other. The long hole 14c may have any shape as long as the stand portion 14b with the long hole 14c can support the first end member 12 so that the first end member 12 cannot rotate and can move in the front-rear direction in the long hole 14c.

The sectional shape of the second support member 15 taken along a longitudinal direction of the roll-up shaft 11 is L shape. The second support member 15 has a fixing portion 15a to be fixed to the vehicle, a stand portion 15b standing from the fixing portion 15a and the long hole 15c formed in the stand portion 15b. The second support member 15 supports the second end member 13 so that the second end member 13 can rotate and move in the front-rear direction within the long hole 15c. The long hole 15c is formed through the stand portion 15b in the left-right direction and prolonged in the front-rear direction. The stand portion 15b and the second end member 13 are equipped at approximately right angles to each other. The long hole 15c may have any shape as long as the stand portion 15b with the long hole 15c can support the second end member 13 so that the second end member 13 can rotate and move in the front-rear direction in the long hole 15c. In this embodiment, the first and second support members 14 and 15 have the same shapes and are disposed to face each other.

The roll-up shaft 11 is rotated by sending off the screen S. The second end member 13 is rotated with the roll-up shaft 11 through the engagement of the key 24a of the second end member 13 and the key aperture 11a of the roll-up shaft 11. Furthermore, the first end member 12 cannot rotate relatively to the first support member 14. Consequently, the roll-up shaft 11 with the second end member 13 rotates relatively to the first end member 12. Therefore, the torsion spring 27 is twisted in accordance with the extent of sending off the screen S, so that tension to urge the screen S in a roll-up direction for the screen S acts on the screen S. Hereby, tension acts on the screen S in the front-rear direction (open-close direction by use of the screen S) so that the screen S is prevented from generating sag and/or wrinkles.

The first support member 14 and the second support member 15 have sectional-L shapes in this embodiment, but may have any shapes as long as they can support the first end member 12 and the second end member 13, respectively.

The abutment member 16 has a push-up portion 31 and a positioning portion 32 as shown in FIGS. 1 and 3. The push-up portion 31 is a plate-like member prolonged in the left-right direction, protruding upward and curved smoothly as shown in FIG. 3. And the push-up portion 31 is fixed to the inner roof member U of the vehicle and pushes up the middle portion of the roll-up shaft 11 so that an upper face of the push-up portion 31 abuts against the roll-up shaft 11 or the screen S rolled up onto the roll-up shaft 11.

Figure 4A:
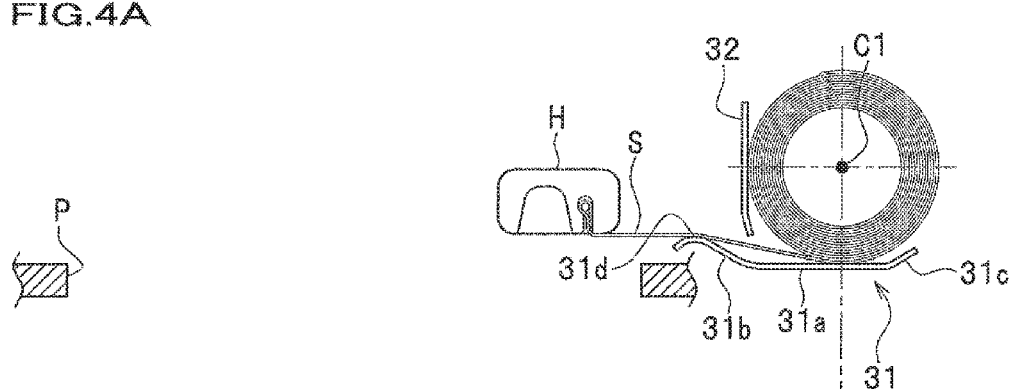
FIG. 4A is a schematic sectional view taken along the line II-II of FIG. 1 showing the sunshade apparatus in the first embodiment in a fully opened state.

The push-up portion 31 has an abutting portion 31a, a first slant portion 31b continuously connected to a front end of the abutting portion 31a and inclining diagonally upward and frontward from the front end of the abutting portion 31a, a second slant portion 31c continuously connected to a rear end of the push-up portion 31a and inclining diagonally upward and rearward from the rear end of the push-up portion 31a, and an end portion 31d continuously connected to the first slant portion 31b and curved so as to protrude upward as shown in FIG. 4A. The screen S is sent off through a gap between the push-up portion 31 and the positioning portion 32 in this embodiment. In this case, the screen S can be smoothly sent off or roll up because the end portion 31d is formed into a curved shape protruding upward.

The push-up portion 31 is formed by a plate-like member in this embodiment, but may be formed by any member as long as it can push up the middle portion of the roll-up shaft 11 upward.

The positioning portion 32 is a plate-like member prolonged in the left-right direction and fixed to the inner roof member U of the vehicle through L shape members as shown in FIG. 1. And the positioning portion 32 is disposed so that a positioning face thereof is at an approximately right angle to the inner roof member U. The positioning portion 32 is disposed in front of the roll-up shaft 11 (on the side near to the opening P) and is a member for positioning the roll-up shaft 11 in the front-rear direction. The positioning portion 32 and the push-up portion 31 are equipped with the gap between them so that the screen S can pass through the gap. The middle portion of the positioning portion 32 is formed into a curved shape protruding upward with approximately the same curvature as the push-up portion 31 as shown in FIG. 3.

The positioning portion 32 is formed by a plate-like member in this embodiment, but may be formed by any member as long as it can regulate a frontward movement of the roll-up shaft 11.

Next, operation of the sunshade apparatus 1 according to this embodiment will be described. A user moves the grip portion H with the screen S forward from the interior of the vehicle so that the opening P is closed. On the contrary, he moves it rearward so that the opening P is opened. Furthermore, when he releases the grip portion H with the screen S at any desired position, the grip portion H stops at that position.

<Fully Opened State>

Figure 4B:
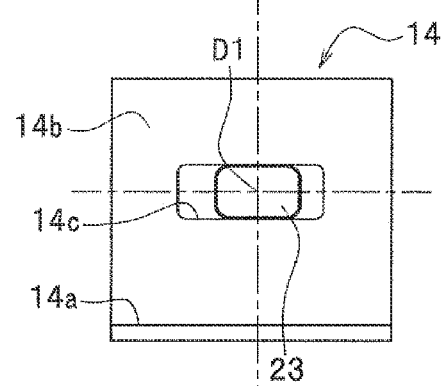
FIG. 4B is a schematic sectional view taken along the line III-III of FIG. 1 showing the sunshade apparatus in the first embodiment in the fully opened state.
Figure 4C:
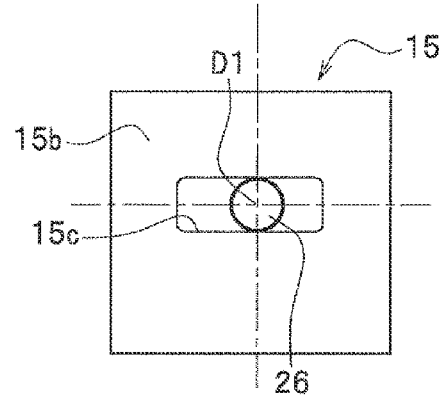
FIG. 4C is a schematic sectional view taken along the line IV-IV of FIG. 1 showing the sunshade apparatus in the first embodiment in the fully opened state.

FIGS. 4A to 4C are schematic sectional views showing the opening P in a fully opened state. The majority area of the screen S has been rolled up onto the roll-up shaft 11 in the fully opened state as shown in FIG. 4A. A term of "roll-up portion" is introduced herein which includes the roll-up shaft 11 and part of the screen S rolled up. An outer diameter of the roll-up portion is largest in the fully opened state. In this state, a movable center C1 of the roll-up portion is most apart from the push-up portion 31 and the positioning portion 32.

And in the fully opened state, a movable center D1 of the protruding portion 23 is at the most rear position in the long hole 14c of the first support member 14 as shown in FIG. 4B. Similarly, the movable center D1 of the shaft portion 26 is also at the most rear position in the long hole 15c of the second support member 15 in the fully opened state as shown in FIG. 4C.

The positions of the movable centers C1, D1 and D1 are substantially the same each other in the front-rear direction as shown in FIGS. 4A, 4B and 4C. Namely, the roll-up shaft 11 is substantially parallel to the left-right direction in a plan view thereof.

<Half Opened State>

Figure 5A:
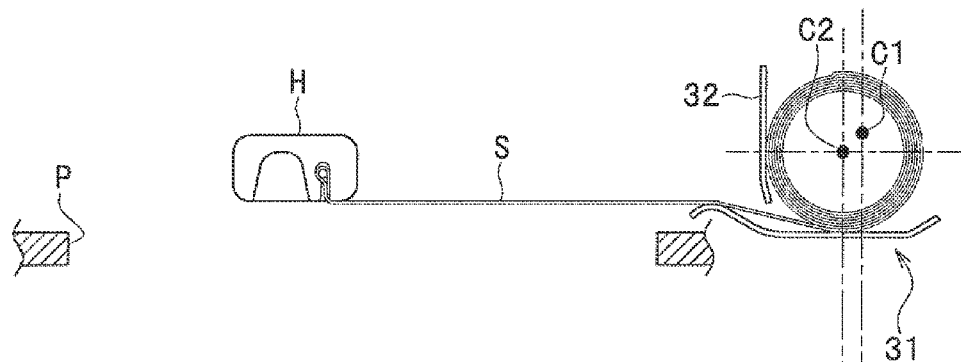
FIG. 5A is a schematic sectional view taken along the line II-II of FIG. 1 showing the sunshade apparatus in the first embodiment in a half opened state.
Figure 5B:
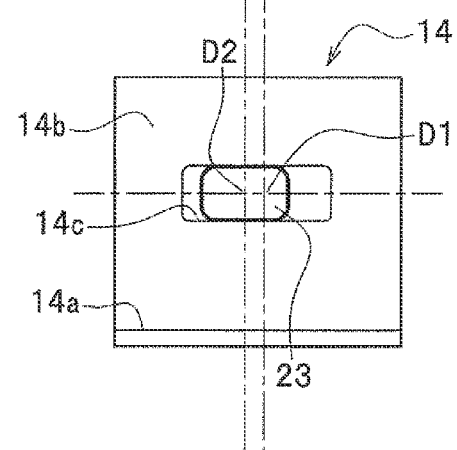
FIG. 5B is a schematic sectional view taken along the line III-III of FIG. 1 showing the sunshade apparatus in the first embodiment in the half opened state.
Figure 5C:
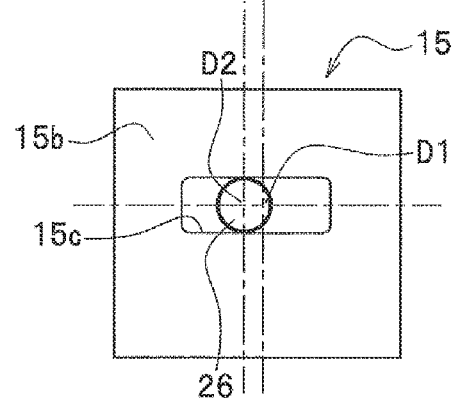
FIG. 5C is a schematic sectional view taken along the line IV-IV of FIG. 1 showing the sunshade apparatus in the first embodiment in the half opened state.

FIGS. 5A to 5C are schematic sectional views showing the opening P in a half opened state. About a half of the screen S has been sent off to the side of the opening P, and the remaining half has been rolled up onto the roll-up shaft 11 in the half opened state as shown in FIG. 5A. The outer diameter of the roll-up portion is smaller than that in the fully opened state. Therefore, a movable center C2 of the roll-up portion in the half opened state is closer to the push-up portion 31 and the positioning portion 32 than the movable center C1 in the fully opened state.

And in the half opened state, the movable center D1 of the protruding portion 23 in the fully opened state has moved to a position of a movable center D2 more anterior than the movable center D1 in the long hole 14c of the first support member 14 in the half opened state as shown in FIG. 5B. Similarly, the movable center D1 of the shaft portion 26 in the fully opened state has also moved to a position of the movable center D2 more anterior than the movable center D1 in the long hole 15c of the second support member 15 in the half opened state as shown in FIG. 5C.

The positions of the movable centers C2, D2 and D2 are substantially the same each other in the front-rear direction as shown in FIGS. 5A, 5B and 5C. Namely, the roll-up shaft 11 is substantially parallel to the left-right direction in a plan view thereof also in the half opened state.

<Completely Closed State>

Figure 6A:
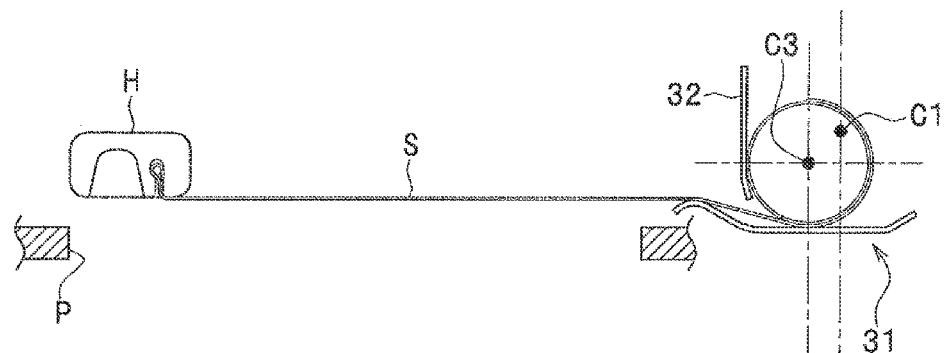
FIG. 6A is a schematic sectional view taken along the line II-II of FIG. 1 showing the sunshade apparatus in the first embodiment in a completely closed state.
Figure 6B:
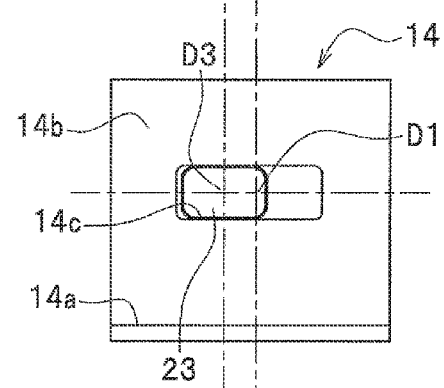
FIG. 6B is a schematic sectional view taken along the line III-III of FIG. 1 showing the sunshade apparatus in the first embodiment in the completely closed state.
Figure 6C:
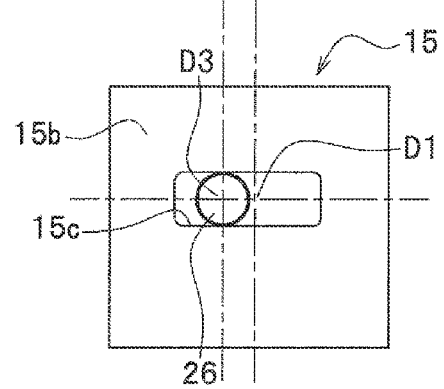
FIG. 6C is a schematic sectional view taken along the line IV-IV of FIG. 1 showing the sunshade apparatus in the first embodiment in the completely closed state.

FIGS. 6A to 6C are schematic sectional views showing the opening P in a completely closed state. The majority area of the screen S has been sent off to the side of the opening P, and the rest has been rolled up onto the roll-up shaft 11 in the completely closed state as shown in FIG. 6A. The outer diameter of the roll-up portion in the completely closed state is smaller than that in the half opened state. Therefore, a movable center C3 of the roll-up portion in the completely closed state is closer still more to the push-up portion 31 and the positioning portion 32 than the movable centers C1 and C2.

And in the completely closed state, the movable center D1 of the protruding portion 23 in the fully opened state has moved to a position of a movable center D3 more anterior than the movable centers D1 and D2 in the long hole 14c of the first support member 14 as shown in FIG. 6B. Similarly, the movable center D1 of the shaft portion 26 in the fully opened state has also moved to a position of the movable center D3 more anterior than the movable centers D1 and D2 in the long hole 15c of the second support member 15 in the completely closed state as shown in FIG. 6C.

The positions of the movable centers C3, D3 and D3 are substantially the same each other in the front-rear direction as shown in FIGS. 6A, 6B and 6C. Namely, the roll-up shaft 11 is substantially parallel to the left-right direction in a plan view thereof also in the completely closed state.

Regardless of the extent of sending off the screen S, part of the screen S rolled up onto the roll-up shaft 11 keeps an abutment against the push-up portion 31 and the positioning portion 32 as shown in FIGS. 4A, 5A and 6A. The screen S is rolled up in order of FIGS. 6, 5, and 4 when the opening P is opened.

According to the above-described sunshade apparatus 1, in addition to tension acting on the screen S in the front-rear direction by the torsion spring 27, another tension acts on the screen S also in the width direction because the roll-up shaft 11 is bent so as to protrude upward by the push-up portion 31. Therefore, the screen S can be prevented from generating sag and/or wrinkles. Furthermore, the whole of the screen S is fully prevented from generating sag and/or wrinkles because the grip portion H equipped at the front end of the screen S also has a curved shape protruding upward. And the grip H and the screen s can smoothly move because each of slits of the guide rails R, R faces to the other slit while facing diagonally upward.

According to this embodiment, the first end member 12 and the second end member 13 disposed at each end of the roll-up shaft 11 can move in the front-rear direction (open-close direction by use of the screen S), so the whole of the roll-up shaft 11 can move. And the roll-up shaft 11 is prevented from displacing only the middle portion thereof when a force acts on the roll-up shaft 11 due to the operation for opening or closing. Hereby, the screen S is fully prevented from generating sag and/or wrinkles and an operation load is reduced when the opening P is opened or closed by use of the screen S.

Second Embodiment

A second embodiment according to the present invention will be described in the following. The second embodiment differs from the first embodiment in the point that a guide rail R, a push-up portion 31, a positioning portion 32 and a second support member 45 are combined. The other structure is the same as the first embodiment, so an explanation to be repeated will be omitted.

A combined frame 41 includes the push-up portion 31, a space portion 42, a connecting portion 43 and a connecting wall portion 44. The space portion 42 is a plate-like planar portion prolonged from an end of the push-up portion 31, and formed for a space for the second end member 13 (refer to FIG. 2) to be disposed.

The connecting portion 43 is connected to an end of the space portion 42, and for attaching the guide rail R thereto. The connecting portion 43 has a through hole 43a passing through in a top-bottom direction. The connecting wall portion 44 is connected to the end of the space portion 42 and prolonged in the top-bottom direction. The connecting wall portion 44 is tightly inserted into the second support member 45. The second support member 45 has a C shape in a plan view and a long hole 45c long in the front-rear direction. Furthermore, the second support member 45 supports the second end member 13 rotatably through the long hole 45c.

A guide rail R on the right side prolonged in the front-rear direction is provided with a flange Ra on the right side thereof. And the flange Ra has a through hole Rb passing through in the top-bottom direction.

A connecting portion 33 is connected to the right end of the positioning portion 32 and prolonged rightward. The connecting portion 33 has a through hole 33a passing through in the top-bottom direction. The combined frame 41, the guide rail R and the positioning portion 32 with the connecting portion 33 are combined by a fastener like a bolt and nut through the through hole 43a of the connecting portion 43, the through hole Rb of the flange Ra and the through hole 33a of the connecting portion 33.

In such a manner, the combined frame 41, the guide rail R, the positioning portion 32 and the second support member 45 are combined to be a unit so that an efficiency of an installation work to a vehicle improves.

Furthermore, the left portion of the combined frame 41 is also substantially the same as the right portion thereof mentioned above. A first support member having substantially the same shape as the second support member 45 is disposed on the left side of the combined frame 41. The first support member supports the first end member. Namely, the unit having the combined frame 41, the both guide rails R, R, the positioning portion 32 and the first and second support members is substantially symmetrical about a line parallel to the front-rear direction. These are not shown.

Figure 8A:
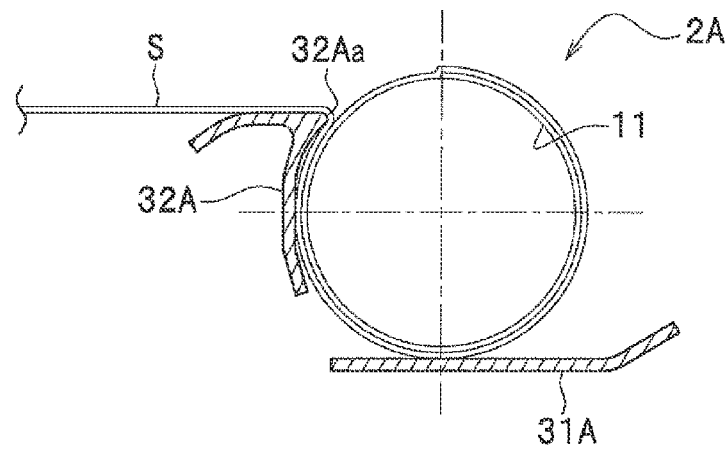
FIG. 8A is a sectional view showing a first alternative example in the first or second embodiment.
Figure 8B:
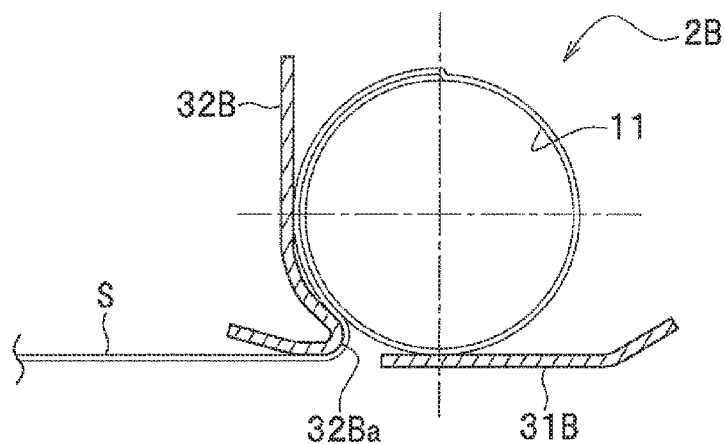
FIG. 8B is a sectional view showing a second alternative example in the first or second embodiment.
Figure 8C:
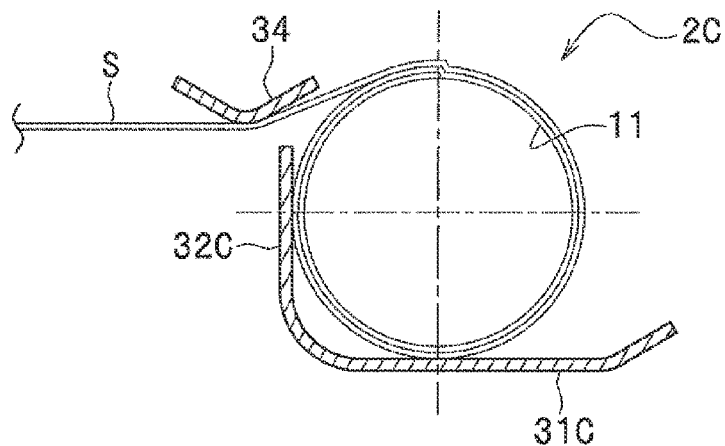
FIG. 8C is a sectional view showing a third alternative example in the first or second embodiment.

Embodiments according to the present invention have been explained in the above. But they may be properly modified within the scope of the present invention. FIGS. 8A, 8B and 8C show three modifications which can be applicable to the first embodiment and also to the second embodiment. FIG. 8A shows a first modification, FIG. 8B shows a second modification and FIG. 8C shows a third modification, and each Figure is a sectional view.

A roll-up device 2A differs from the aforementioned two embodiments in the point that the screen S is sent off on or over a top surface of a positioning portion 32A as shown in FIG. 8A. A rounded portion 32Aa is formed at the upper portion of the positioning portion 32A to send off the screen S smoothly while the screen S is abutting against the rounded portion 32Aa.

A roll-up device 2B differs from the aforementioned two embodiments in the point of the rotational direction of the roll-up shaft 11 as shown in FIG. 8B. A rounded portion 32Ba is formed at the lower portion of the positioning portion 32B to send off the screen S smoothly while the screen S is abutting against the rounded portion 32Ba.

A roll-up device 2C differs from the aforementioned two embodiments in the point that a push-up portion 31C and a positioning portion 32C are formed into one piece as shown in FIG. 8C. In this modification, the screen S is sent off over the positioning portion 32C while abutting against a guide portion 34.

Furthermore, another structure is also allowable which is formed so that the screen S is sent off behind the push-up portion 31C and then sent off forward with the prior condition that the push-up portion 31C and the positioning portion 32C are formed into one piece These are not shown.

The screen S is sent off or rolled up by manual operation in the aforementioned embodiments, but it may be sent off or rolled up by electric drive.

DESCRIPTION OF REFERENCE NUMERALS

1 Sunshade apparatus
2 Roll-up device
11 Roll-up shaft
12 First end member
13 Second end member
14 First support member
15 Second support member
16 Abutment member
31 Push-up portion
32 Positioning portion
H Grip portion
P Opening
R Guide rail
S Screen
U Inner roof member

What is claimed is:

1. A sunshade apparatus to be mounted over an opening of a roof of a vehicle, comprising:
    a pair of guide rails to be disposed on both sides of the opening;
    a screen to move along a longitudinal direction of each of the pair of guide rails to open or close the opening; and
    a roll-up device to send off or roll up the screen, wherein the roll-up device comprises
        a roll-up shaft having bending flexibility;
        a pair of end members disposed at both ends of the roll-up shaft;
        a pair of support members to be fixed to the vehicle to support each of the pair of end members; and
        an abutment member including a push-up portion to bend the roll-up shaft so as to protrude upward and a positioning portion to be disposed on the side of the opening relatively to the roll-up shaft to position the roll-up shaft,
    the pair of end members being formed so as to be movable relatively to the pair of support members in an open-close direction in which the screen is rolled up or sent off when the opening is opened or closed by use of the screen.

2. The sunshade apparatus according to claim 1, wherein each of the pair of support members has a long hole long in the open-close direction and formed therein, and each of the pair of end members can move in the corresponding long hole.

3. The sunshade apparatus according to claim 1, wherein each of the pair of guide rails has a slit through which the screen moves, and each slit faces to the other slit, facing diagonally upward in the state that each guide rail is disposed on the vehicle.

4. The sunshade apparatus according to claim 2, wherein each of the pair of guide rails has a slit through which the screen moves, and each slit faces to the other slit, facing diagonally upward in the state that each guide rail is disposed on the vehicle.

5. The sunshade apparatus according to claim 1, wherein a grip portion provided at a front end of the screen has a curved shape protruding upward.

6. The sunshade apparatus according to claim 2, wherein a grip portion provided at a front end of the screen has a curved shape protruding upward.

7. The sunshade apparatus according to claim 3, wherein a grip portion provided at a front end of the screen has a curved shape protruding upward.

8. The sunshade apparatus according to claim 4, wherein a grip portion provided at a front end of the screen has a curved shape protruding upward.

* * * * *